United States Patent
Price et al.

(10) Patent No.: US 9,082,286 B2
(45) Date of Patent: Jul. 14, 2015

(54) CUSTOMIZABLE POLICY ENGINE

(75) Inventors: Michael John Price, Palo Alto, CA (US); Gilead Wurman, Union City, CA (US)

(73) Assignee: Seismic Warning Systems, Inc., Scotts Valley, CA (US)

( * ) Notice: Subject to any disclaimer, the term of this patent is extended or adjusted under 35 U.S.C. 154(b) by 85 days.

(21) Appl. No.: 13/985,136

(22) PCT Filed: Feb. 27, 2012

(86) PCT No.: PCT/US2012/026783
§ 371 (c)(1),
(2), (4) Date: Oct. 2, 2013

(87) PCT Pub. No.: WO2012/116367
PCT Pub. Date: Aug. 30, 2012

(65) Prior Publication Data
US 2014/0022075 A1    Jan. 23, 2014

Related U.S. Application Data

(60) Provisional application No. 61/447,025, filed on Feb. 26, 2011.

(51) Int. Cl.
G08B 21/10 (2006.01)
G06Q 40/08 (2012.01)
G08B 27/00 (2006.01)

(52) U.S. Cl.
CPC .............. *G08B 21/10* (2013.01); *G06Q 40/08* (2013.01); *G08B 27/001* (2013.01); *G08B 27/005* (2013.01)

(58) Field of Classification Search
CPC ......... G01V 1/008; G06Q 40/08; G08B 21/10
USPC .................. 340/540, 601, 506, 690; 709/217; 702/14
See application file for complete search history.

(56) References Cited

U.S. PATENT DOCUMENTS

| | | | |
|---|---|---|---|
| 5,910,763 A | 6/1999 | Flanagan | |
| 6,169,476 B1 * | 1/2001 | Flanagan | ...................... 340/690 |
| 6,208,247 B1 | 3/2001 | Agre et al. | |
| 6,654,689 B1 * | 11/2003 | Kelly et al. | .................... 340/601 |
| 6,816,878 B1 * | 11/2004 | Zimmers et al. | ............... 340/540 |
| 7,005,993 B2 | 2/2006 | Webb et al. | |
| 7,353,114 B1 | 4/2008 | Rohlf et al. | |

(Continued)

FOREIGN PATENT DOCUMENTS

| CN | 101354757 A | 1/2009 |
|---|---|---|
| CN | 101567124 A | 10/2009 |

(Continued)

OTHER PUBLICATIONS

Agius et al.; A Single-Station Automated Earthquake Location System at Wied Dalam Station—Malta; Seismol Res Lett; 82(4):545-559; Jul./Aug. 2011.

(Continued)

*Primary Examiner* — John A Tweel, Jr.
(74) *Attorney, Agent, or Firm* — Shay Glenn LLP (57) ABSTRACT

Embodiments disclose a system and method that distributes warning with a description the probability of the severity of the hazardous condition producing the warning and incorporating a policy engine for expressing rules for responding to the warning.

49 Claims, 3 Drawing Sheets

(56) References Cited

U.S. PATENT DOCUMENTS

| | | | |
|---|---|---|---|
| 8,519,860 B2 * | 8/2013 | Johnson et al. | 340/601 |
| 2003/0184445 A1 | 10/2003 | Chen et al. | |
| 2005/0027571 A1 | 2/2005 | Gamarnik et al. | |
| 2005/0280421 A1 | 12/2005 | Yomoda et al. | |
| 2007/0279239 A1 | 12/2007 | Lachenit et al. | |
| 2009/0054079 A1 | 2/2009 | Dubinsky | |
| 2009/0295587 A1 | 12/2009 | Gorman, Jr. | |
| 2010/0169021 A1 | 7/2010 | Moisio | |
| 2011/0037588 A1 | 2/2011 | Zeng et al. | |
| 2013/0328688 A1 | 12/2013 | Price et al. | |

FOREIGN PATENT DOCUMENTS

| | | |
|---|---|---|
| CN | 101630011 A | 1/2010 |
| JP | 2000-121743 A | 4/2000 |
| JP | 2002-168964 A | 6/2002 |
| JP | 2006-078297 A | 3/2006 |
| KR | 2003-24722 Y1 | 8/2003 |

OTHER PUBLICATIONS

Boatwright et al.; The Dependence of PGA and PGV on Distance and Magnitude Inferred from Northern California ShakeMap Data; Bulletin of the Seismological Society of America; 93(5):2043R2055: Oct. 2003.

Convertito et al.; Prediction of Response Spectra via Real-Time Earthquake Measurements; Soil Dynamics and Earthquake Eng; 28(6):492-505; Jun. 2008.

Iervolino et al.; Real-Time Risk Analysis for Hybrid Earthquake Early Warning Systems; J Earth Eng; 10(6):867-885; Nov. 2006.

Kuehn et al.; A Naive Bayes Classifier for Intensities Using Peak Ground Velocity and Acceleration; Bulletin of the Seismological Society of America;100(6):3278R3283,; Dec. 2010.

Rydelek et al.; Real-Time Seismic Warning with a Two-Station Subarray; Bulletin of the Seismological Society of America; 94(4):1546-1550; Aug. 2004.

Wald et al; ShakeMap® Manual, Technical Manual, Users Guide, and Software Guide; USGS; 156 pgs; Jun. 19, 2006.

* cited by examiner

CUSTOMIZABLE POLICY ENGINE

CROSS REFERENCE TO RELATED APPLICATIONS

This application claims priority to U.S. Provisional Application No. 61/447,025, filed Feb. 26, 2011, titled "Customizable Policy Engine."

INCORPORATION BY REFERENCE

All publications and patent applications mentioned in this specification are herein incorporated by reference to the same extent as if each individual publication or patent application was specifically and individually indicated to be incorporated by reference.

FIELD

This application relates generally to systems and methods for processing hazard data. More specifically, this application relates to systems and methods for processing hazard data and probability data to generate warnings that can be used to initiate a hazard response.

BACKGROUND

Earthquake Warning Systems (EWS) rely on rapid detection and characterization of earthquake ground motions to provide alerts in advance of hazardous shaking. Because the warning time afforded by EWS is short (on the order of a few seconds) there are very few actions that may be taken that have not been premeditated in advance of the event. These actions generally fall into two categories: automated, meaning electronically or electromechanically actuated in response to an electronic signal; or human-mediated, i.e. actuated as the reaction of a human receiving an auditory or visual signal. In general the auditory/visual signal in the latter category is itself an automated action initiated in response to an electronic warning.

Existing EWS typically issue a binary warning ("hazard" or "no hazard"). However, because the cost of taking any action is not zero, it is important to consider, for each individual asset and each separate action, the potential benefit to taking action for a given level of anticipated ground motion (intensity) and a given estimated uncertainty in that level. This analysis can be performed at any desired level of sophistication, but it requires that the electronic warning issued by the EWS encode both the level of anticipated ground motion and the estimated uncertainty in that level. Because time is of the essence, this information must be communicated by the EWS in as compact a form as possible.

The response to an EWS warning can encompass both human-mediated and automated actions. Automated actions must be based on a predetermined policy encoding what to do, and under what warning conditions. In the simplest policy, the only condition is whether a binary warning exists, and the action to undertake does not vary from warning to warning. A more sophisticated policy may encode many different actions, to be undertaken under varying conditions of estimated ground motion and confidence levels. In such a sophisticated system, even human-mediated responses are ultimately automated in that a decision must be made in advance as to what warning conditions trigger notification of the mediating persons.

There is usually a cost with taking an action in response to an earthquake warning. This cost might be the productivity impact of personnel responding to an alert or the lost availability of equipment that is shut down. There may be a significant restart cost for equipment or processes that have been shut down. There is also a cost associated with taking no action to protect people and assets. In many cases, the decision to initiate a response to the earthquake warning is a balance between the expected cost of damage and the cost of a shutdown.

Because different users will have differing requirements for actions to undertake, and conditions under which to initiate those actions, a sophisticated policy engine is needed to encode the user's desired policies and to implement them in the event of a warning from the EWS.

SUMMARY OF THE DISCLOSURE

Embodiments of the present inventions relate to systems, methods and devices containing a customizable policy engine allowing the consumer of the earthquake warning to set threshold uncertainty and ground motion levels independently for each action the consumer wishes to consider in the event of an earthquake. The policy engine allows the consumer to set, according to any analysis the consumer chooses to perform, both an intensity level and a confidence level above which an action should be taken. Different actions may be assigned different intensity and confidence levels, and multiple intensity and confidence levels may be assigned to the same action (for example, a lower intensity but higher confidence may trigger the same action as a higher intensity with lower confidence).

Under this policy engine any, all, or no actions may be initiated during an event depending on the level of anticipated ground motion and the uncertainty in that level. If the value of either of these quantities varies over the duration of the event, different actions may be initiated at different times, as their pre-determined thresholds for initiation are crossed. If emerging information about the event leads to a reduction in the confidence level at the threshold ground motion, already-initiated actions may be terminated or continued according to predetermined conditional policies.

The policy engine may also incorporate information about the estimated time of onset of hazardous ground motion, provided by the EWS, in deciding whether to initiate actions or which action to initiate at a given threshold ground motion.

The engine also accepts additional input data as desired for incorporation into policy decisions. For example the engine may allow for initiating actions based on actual observed hazardous ground motions at the site rather than predicted ground motions, for incorporating network connectivity information into policy decisions, or for meta-analysis of the encoded warning data, e.g., rate-of-change of encoded parameters as a policy criterion. The policy engine may also accept conditional thresholds based on known or assumed health status of assets following a major event, e.g. reducing threshold ground motions for aftershocks following a damaging earthquake.

In addition, all recorded inputs to the policy engine and actions initiated by the policy engine are recorded in memory during an event and written to stable media as soon as practical following an event, for audit purposes.

In some embodiments, a system for distributing warnings regarding an event is provided. The system includes a policy specification subsystem for generating one or more machine readable policies, each policy comprising at least one rule and at least one action associated with the at least one rule, wherein each rule includes a plurality of event parameters and an associated plurality of predetermined event parameter probabilities; a change detection subsystem for receiving and monitoring data from a sensor system, the data including expected event parameter values and associated deviation metrics; a policy execution subsystem for executing the at least one rule and triggering the at least one action based on a comparison of the expected event parameter values and associated deviation metrics with the event parameters and the associated predetermined event parameter probabilities of the at least one rule, wherein the policy execution subsystem initiates processing of the at least one rule after receiving instructions from the change detection subsystem, wherein the change detection subsystem sends instructions to the policy execution subsystem upon detection of a predetermined change in at least one of the expected event parameter values; and an action processing subsystem for generating an output for performing the at least one action triggered by the policy execution subsystem.

In some embodiments, the system further includes a traceback subsystem that logs the operations of each subsystem to fixed media for evaluation following an event.

In some embodiments, the policy specification subsystem can accept input from an end user or third party or a combination of the end user and third party to generate the machine readable policy.

In some embodiments, the at least one rule comprises a Boolean predicate.

In some embodiments, the at least one rule comprises a fuzzy rule and the at least one action comprises a continuous action function.

In some embodiments, the at least one rule is expressed as a probability of exceeding a predetermined value of one of the plurality of event parameters.

In some embodiments, the probability of exceeding a predetermined value is computed based on a Gaussian distribution with a predetermined expected value and deviation.

In some embodiments, the policy execution subsystem executes the at least one rule in serial order and resolves conflicts and triggers actions based on the resolved rules.

In some embodiments, the action processing subsystem monitors the performance of triggered actions to verify that the actions have been executed to completion.

In some embodiments, the warning contains a parameterized summary of the event.

In some embodiments, the parameterized summary includes a probability distribution or information for the computation of a probability distribution.

In some embodiments, the output is produced periodically based upon detection of a predetermined change in at least one of the expected event parameter values.

In some embodiments, the policy comprises a predicate and an action or a continuous function of input parameters and a continuously varying control output.

In some embodiments, the policy specification subsystem receives information regarding the status of a device that receives the output of the action processing subsystem and modifies the policy based on the status of the device.

In some embodiments, the policy specification subsystem adjusts the rules based on past data.

In some embodiments, the rules are updated in real time.

In some embodiments, the policy specification subsystem comprises a plurality of user interfaces tailored to a user's level of expertise that allows the user to customize the rules.

In some embodiments, the probability distribution represents the severity of the event.

In some embodiments, the output is sent to a speaker or a display to generate a warning message.

In some embodiments, the output energizes a relay or controls the operation of a motor, engine or turbine.

In some embodiments, the event is an earthquake and the event parameters include one or more of peak ground jerk, peak ground acceleration, peak ground velocity, peak ground displacement, modified Mercalli intensity, estimated time of arrival of hazardous shaking, and actual time of the arrival of S-waves. These parameters describe the anticipated shaking at some specific site and can include local effects (such as soil conditions) or not. Parameters may also describe actual measurements of ground shaking at some remote site or at the local site. The difference in a forecast of shaking intensity and the measurement of shaking intensity is represented in the confidence of the intensity estimate (an estimate based on a measurement will have high confidence both in expected value and standard deviation) but still involves estimating local intensity based on remote measurements. Should local measurements be available, these can be given higher significance in policy definitions.

In some embodiments, each policy is assigned a priority.

In some embodiments, the priority is specified through definition order, manually assigned by a user, or changed by the actions of a policy.

In some embodiments, the rules can reference action states and external system variables.

In some embodiments, a computer implemented method for distributing warnings regarding an event is provided. The method includes generating one or more machine readable policies, each policy comprising at least one rule and at least one action associated with the at least one rule, wherein each rule includes a plurality of event parameters and an associated plurality of predetermined event parameter probabilities; receiving and monitoring data from a sensor system, the data including expected event parameter values and associated deviation metrics; initiating processing of the at least one rule upon detection of a predetermined change in at least one of the expected event parameter values; executing the at least one rule and triggering the at least one action based on a comparison of the expected event parameter values and associated deviation metrics with the event parameters and the associated predetermined event parameter probabilities of the at least one rule; and generating an output for performing the at least one action triggered by the policy execution subsystem.

In some embodiments, the method further includes logging the operations of each subsystem to fixed media for evaluation following an event.

In some embodiments, the method further includes accepting input from an end user or third party or a combination of the end user and third party to generate the machine readable policy.

In some embodiments, the at least one rule comprises a Boolean predicate.

In some embodiments, the at least one rule comprises a fuzzy rule and the at least one action comprises a continuous action function.

In some embodiments, the at least one rule is expressed as a probability of exceeding a predetermined value of one of the plurality of event parameters.

In some embodiments, the probability of exceeding a predetermined value is computed based on a Gaussian distribution with a predetermined expected value and deviation.

In some embodiments, the method further includes executing the at least one rule in serial order and resolving conflicts and triggers actions based on the resolved rules.

In some embodiments, the method further includes monitoring the performance of triggered actions to verify that the actions have been executed to completion.

In some embodiments, the warning contains a parameterized summary of the event.

In some embodiments, the parameterized summary includes a probability distribution or information for the computation of a probability distribution.

In some embodiments, the output is produced periodically based upon detection of a predetermined change in at least one of the expected event parameter values.

In some embodiments, the policy comprises a predicate and an action or a continuous function of input parameters and a continuously varying control output.

In some embodiments, the method further includes receiving information regarding the status of a device that receives the output of the action processing subsystem and modifies the policy based on the status of the device.

In some embodiments, the method further includes adjusting the rules based on past data.

In some embodiments, the method further includes updating the rules in real time.

In some embodiments, the method further includes customizing the rules using a plurality of user interfaces tailored to a user's level of expertise.

In some embodiments, the probability distribution represents the severity of the event.

In some embodiments, the method further includes sending the output to a speaker or a display to generate a warning message.

In some embodiments, the method further includes sending the output to energize a relay or control the operation of a motor, engine or turbine.

In some embodiments, the event is an earthquake and the event parameters include one or more of peak ground jerk, peak ground acceleration, peak ground velocity, peak ground displacement, modified Mercalli intensity, estimated time of arrival of hazardous shaking, and actual time of the arrival of S-waves.

In some embodiments, the method further includes assigning a priority to each policy.

In some embodiments, the priority is specified through definition order, manually assigned by a user, or changed by the actions of a policy.

In some embodiments, the rules can reference action states and external system variables.

In some embodiments, a device for distributing warnings regarding an event is provided. The device includes a processor and memory for storing instructions which when executed by the processor causes the processor to: generate one or more machine readable policies, each policy comprising at least one rule and at least one action associated with the at least one rule, wherein each rule includes a plurality of event parameters and an associated plurality of predetermined event parameter probabilities; receive and monitor data from a sensor system, the data including expected event parameter values and associated deviation metrics; initiate processing of the at least one rule upon detection of a predetermined change in at least one of the expected event parameter values; execute the at least one rule and triggering the at least one action based on a comparison of the expected event parameter values and associated deviation metrics with the event parameters and the associated predetermined event parameter probabilities of the at least one rule; and generate an output for performing the at least one action triggered by the policy execution subsystem. In some embodiments, the device can be one or more computers or servers.

In other embodiments, some or all of the instructions described above and herein can be implemented on hardware such as an application-specific integrated circuit.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

In some embodiments, a Policy Engine comprises five functional subsystems: a policy specification subsystem 1, a policy execution subsystem 4, a change detection subsystem 3, an action processing subsystem 5, and a traceback subsystem 6. Refer to the block diagram in FIG. 1. The change detection subsystem can receive real-time event data from an earthquake warning system 30, which receives and processes data from an earthquake sensor 29, as described for example in International Patent Application No. PCT/US2011/065733, filed Dec. 19, 2011 and titled "Earthquake Warning System," which is hereby incorporated by reference herein. The change detection subsystem can also receive local state and input data 31. Other earthquake sensors and other hazard sensors can be suitable as well. The action processing subsystem generates outputs 32 that can be sent to a variety of devices and systems as further described below.

Figure 1:
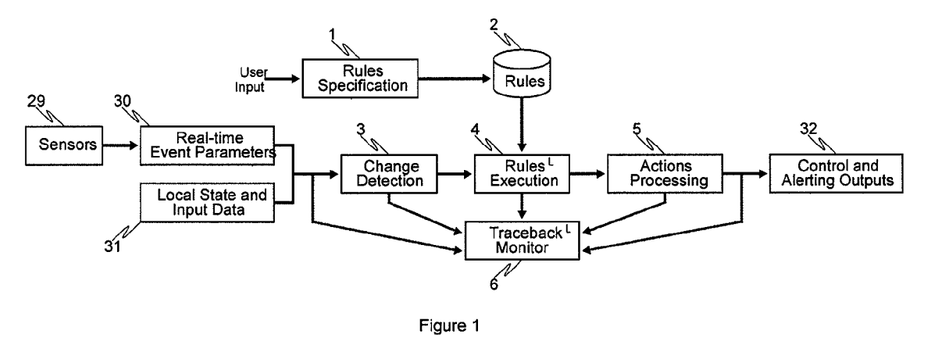
FIG. 1 is a data flow diagram depicting the processing of inputs and the generation of alert outputs.

In some embodiments, the policy specification subsystem 1 can be implemented in an Alerting Device or on a server. In some embodiments, an application with a UI and file import (for text-based policy specification) runs on a web server or other app environment (e.g. mobile), or on a computer (desktop) and communicates with the Alerting Device either directly (USB) or through an Internet connection. Compilation of policies into the internal form needed by the Alerting Device or servers is done in the application (to provide immediate feedback to the user). Storage of the policies (and their internal representations) can be in a database, file, or any other suitable data storage structure, in the Alerting Device or on a server.

In some embodiments, the policy execution subsystem 4 can also reside in the Alerting Device or on a server. In some embodiments, the Alerting Device is a standalone hardware device that includes control outputs and information security features for communication. The alerting device can also be some other dedicated hardware device, such as an industrial controller or computer, running the Policy Engine software. Except in cases where the control output is a software protocol (like an SNMP trap message), the Alerting Device has physical outputs, such as audio and/or relay contacts for example, used to communicate the alert to other devices to initiate their protective responses, as further described below.

In some embodiments, the change detection subsystem 3 can also reside in the Alerting Device to initiate the recomputation of the policies leading to updated control and alert outputs. This subsystem receives messages from the Earthquake Warning System (via the Internet or other data communication system for example) or messages from other information sources whose outputs or states are referenced in the policies. This subsystem may also have physical inputs (digital, voltage, or current, etc.) that are used to monitor states or values referenced in the policies (this might include, for example, the running status of a machine to be controlled, such as fan speed—mentioned below).

In some embodiments, the action processing subsystem 5 can be software running in the Alerting Device that executes policy actions and directly manages alert and control outputs as further described below. This software is responsible for manipulating the outputs to produce the desired control response in the equipment or system interfaced to the Alerting Device.

In some embodiments, the traceback subsystem 6 can be software running in the Alerting Device to monitor the operation of the other subsystems. It also can have access to all or some of the inputs (messages or polled) so that a complete record of the stimulus and response during the earthquake warning period can be recorded. The trace data is written into non-volatile storage (such as FLASH) in the Alerting Device and can be sent to remote systems (such as a server) for off-site archive. A database or log file is an example of a way the trace data can be stored, where the database can be on a server and the log file can be written in FLASH.

Policies

A policy defines an action to be taken under specific conditions. Each policy can comprise a rule and an associated action. A rule can be described as a Boolean predicate or a continuous function (referred to as a fuzzy rule). The action can take one of several forms: it assigns an internal state variable, it initiates an external process (such as energizing a relay, starting the streaming of an audio alert, or sending a message), it initiates an internal process (such as changing a device's operating parameters), or it modifies the policy engine itself (such as transitioning to a higher state of alert in which policies may be different), or any combination of these.

A predicate is a Boolean rule which, when its value changes, causes some specified action or actions to be performed. The predicate is an arbitrary expression of input and state variables. A fuzzy rule is used to express a range of possible responses. For example, the speed of a rotating machine may be reduced for small events and eventually stopped for large events. A namespace defines available inputs for rules and outputs for actions.

Policy Specification

The policy specification subsystem 1 accepts policy definitions in human readable forms and converts them into an internal form used by the policy execution subsystem 4. Policies can be captured in several different representations including statements in a formal language, XML documents, graphical diagrams, or other forms.

Some typical examples include:

```
if (predicate_specification) then action_specification
continuous_function (fuzzy_specification)
<policy>
        <predicate>predicate_specification</predicate>
        <action>action_specification</action>
</policy>
<policy>
        <fuzzy>fuzzy_specification</fuzzy>
        <action>action_specification</action>
</policy>
```

In the example provided above, "predicate_specification" is a Boolean expression. The preferred embodiment uses the following general expression grammar:

```
expression         ::= simpleExpression ( relationalOp
                       simpleExpression )?
relationalOp       ::= '<' | '<=' | '==' | '!=' | '>=' | '>'
simpleExpression   ::= term ( addOperator simpleExpression )?
addOperator        ::= '+' | '-' | 'or' | '||'
term               ::= factor ( factor mulOperator term )?
mulOperator        ::= '*' | '/' | 'div' | 'mod' | 'and' | '&&'
factor             ::= literalConstant | variable | function |
                       unaryOperator factor | '(' expression ')'
unaryOperator      ::= '+' | '-' | 'not'
literalConstant    ::= integerLiteral | realLiteral | stringLiteral
integerLiteral     ::= [0-9]+
realLiteral        ::= integerLiteral '.' integerLiteral |
                       integerLiteral ( '.' integerLiteral )? 'E' scaleFactor
scaleFactor        ::= [+-]? integerLiteral
stringLiteral      ::= '"'
                       any_printing_character_or_escaped_quote+ '"'
variable           ::= simpleVariable | compoundVariable
simpleVariable     ::= identifier
identifier         ::= [a-zA-Z] [a-zA-Z0-9_]*
compoundVariable   ::= simpleVariable ( '.' propertyOrFunction )+
propertyOrFunction ::= identifier ( '(' expression ( ',' expression )? ')' )?
```

Rule Namespace

The rule namespace contains an object, event, which contains all event parameters as reported by the EWS or obtained through local measurements. The event object has the following child objects:

event.jerk—peak ground jerk (broadband or in a designated frequency band)

event.acceleration—peak ground acceleration (broadband or in a designated frequency band)

event.velocity—peak ground velocity (broadband or in a designated frequency band)

event.displacement—peak ground displacement (broadband or in a designated frequency band)

event.mmi—Modified Mercalli Intensity or Instrumental Intensity, defined internally as a function of event.jerk, event.acceleration, event.velocity and event.displacement event.eta—estimated time in seconds until the arrival of hazardous shaking event.toa—actual (detected) time of the arrival of S-waves.

Each of the physical objects (mmi, jerk, acceleration, velocity, and displacement) has the following methods:

poe (level, [band])—returns the probability of exceeding specified level in specified band or broadband roc ([band])—returns the rate of change of a property in a specified band or broadband The eta object also has a roc( )method.

Each of the event child objects has the following data series objects which are vectors assembled by the Policy Engine from data sent by the EWS in warning update messages:

ev—a time series of expected values as reported by the EWS in a series of updates.

dev—a time series of standard deviations as reported by the EWS in a series of updates.

obs—a time series of observation times of ev and dev.

These data series objects have the following properties and methods:

num—number of elements in the time series.

latest—the latest value received in an EWS update.

mean—the mean of the values received.

roc( )—rate of change of the data.

In some embodiments, num, latest, mean, and roc( ) data can be provided by a remote server rather than derived from a local history (i.e. offloaded to the server).

Some examples of the use of these objects in a predicate expression:

```
/* probability of PGV exceeding 70cm/s is greater than 50% */
event.velocity.poe (70) > 0.5
/* probability of PGA in the 3.0Hz band exceeding 0.7cm/s/s is greater
than or equal to 65%
*/
event.acceleration.poe (0.7, 3.0) >= 0.65
/* probability of PGA exceeding 120 cm/s/s or velocity exceeding
450 cm/s > 50% */
event.acceleration.poe (120) > 0.5 or event.velocity.poe (450) > 0.5
```

Other equivalent ways of expressing these expressions can also be provided as required to assist users in expressing their intentions.

Figure 2:
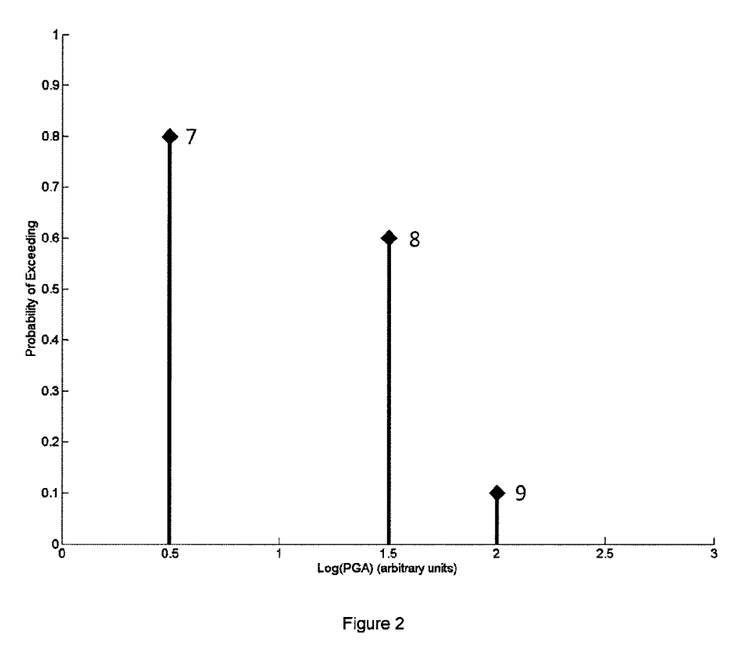
FIG. 2 is a graphical representation of a hypothetical policy.

FIG. 2 shows a graphical representation of a hypothetical policy. The policy is composed of three rules:

1. if event.acceleration.poe (3.16)>=0.8 then action_A see (7)
2. if event.acceleration.poe (31.6)>=0.6 then action_B see (8)
3. if event.acceleration.poe (100)>=0.1 then action_C see (9)

In any event, any number of these actions may be initiated depending on the combination of the estimated intensity of shaking and the uncertainty in the estimate.

Rate-of-change can be applied to any variable or input. Operators work on all classes of inputs.

Policy priority is specified explicitly through definition order. Manual priority can also be assigned. Priorities can be changed by the actions of a policy (elevate some policies based on previous policies being triggered).

Rules can refer to past history (useful, for example, for reducing the threshold for action once a large event has occurred under the assumption that damage has increased vulnerabilities). Past history including past data and historic data can be stored in a database that can be accessed by the policy specification subsystem or any other subsystem. In addition, real-time data can be added to the database so that the database is up to date.

Rules can refer to system variables in the system implementing the Policy Engine. This namespace can be extended by adding names from other namespaces along with access and monitoring functions.

Rules can reference action states (what has already been initiated) and external system variables (such as switches and imported data).

Figure 6:
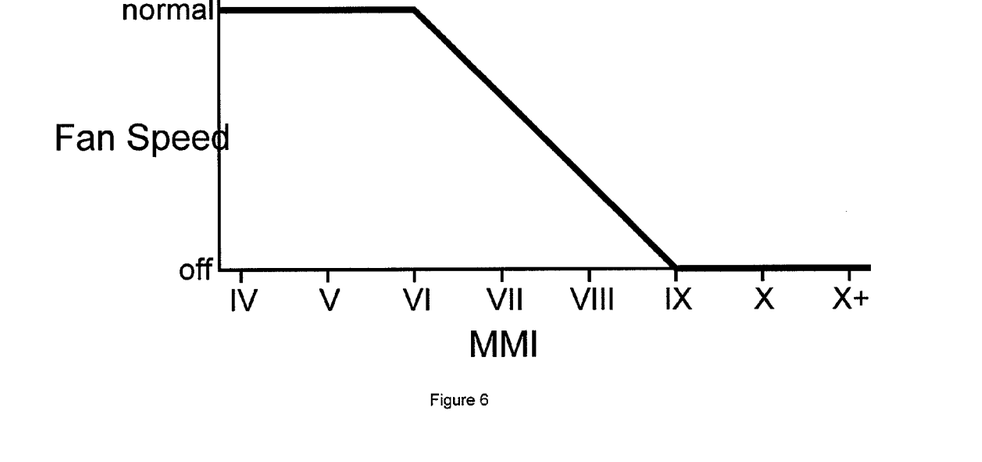
FIG. 6 is a graph illustrating fan speed as a function of expected intensity of an earthquake.

A policy can also describe a continuous function using a fuzzy rule. This rule defines a relationship between an output control variable (like fan speed) and the expected shaking intensity. One such rule is shown in FIG. 6. In this example, the fan speed is gradually reduced to zero as the expected intensity goes to MMI IX. This approach balances the risk of damage with the benefits of continued operation. The policy definition for this might be:

if (expected_mmi<6 then fan_speed=normal;
if (expected_mmi>9 then fan_speed=off;
if (expected_mmi>=6 then fan_speed=normal*(9-expected_value)/3

These become fuzzy because the truth of the expression "expected_mmi<6" is not binary, but provided as a probability of exceedance.

Change Detection Subsystem

The change detection subsystem 3 monitors all variables for changes as messages are received from the local sensor analysis system or from remote systems. When new data arrives, if any of the values change, the rules execution subsystem is notified to process its rules. This allows rules to be updated as soon as conditions change so that actions can be initiated quickly. The change detection subsystem monitors all variables that are referenced by existing rules, informing the rules execution subsystem that a change has occurred only for those variables. Changes in variables that do not affect existing rules do not cause the rules execution subsystem to be invoked. In some embodiments, the change detection system can be agnostic as to the magnitude of the change, but each rule can be written to only consider a certain level of change significant enough to act on.

For example, in some embodiments, the new data arrives at the change detection subsystem through messages or input monitoring. In the case of a message or event of some kind, such as an update message, the change can be quantized in time due to the nature of the message, which provides a sample of the input at some discrete time. When a new message arrives, if the value of the input is different than the value received previously, then the policies using that value are updated and/or recomputed.

In the case of a monitored or polled input, the input may be noisy. In some embodiments, a polling interval can be used to quantize (in time) the impact of changes in much the same way as the input messages mentioned above. In some embodiments, polling using a rate-limiting approach is accomplished by sampling the data at a predetermined time interval or at predetermined points in time. Input sampling is usually periodic, such as once per second or greater or less than once per second, and this periodicity limits how often the input can have an affect regardless of how noisy the data is. In addition or alternatively, input filtering (like a low-pass filter), and minimum thresholds for initiating a change can also be used. In some embodiments, low-pass or band-pass filtering can be used to reduce the noise on an input. For example, if an input is expected to change no more frequently than once a second, a 1 Hz low-pass filter will reduce or filter out any changes that occur more frequently. In some embodiments, a hysteresis can also be specified to reduce the effect of a noisy input and prevent spurious change detections. In this context, hysteresis refers to a threshold that is higher when the input is increasing and lower when it is decreasing, which creates a dead-band between the two thresholds that prevents small changes from causing output changes. In some embodiments, both rate-limiting and hysteresis can be used. In other embodiments, different combinations of the above techniques of processing noisy data can be used.

Figure 3:
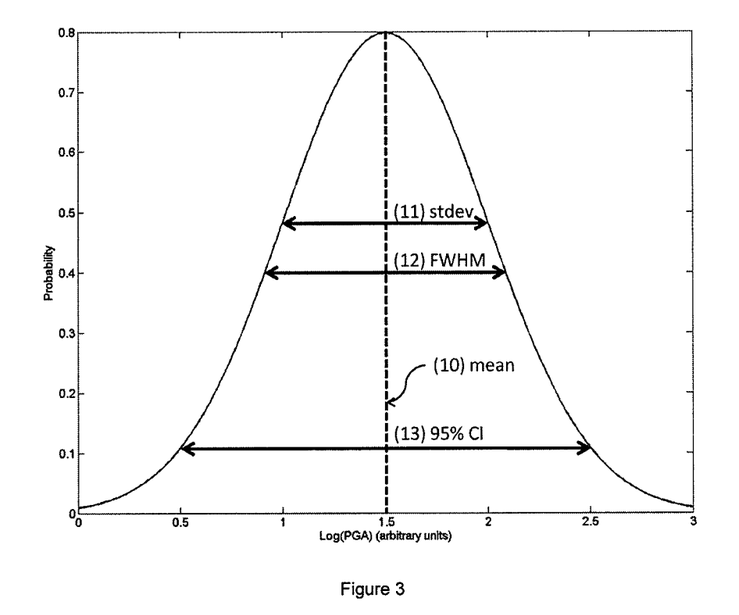
FIG. 3 is a representation of the probability distribution of estimated ground motions in an example event, showing the mean and standard deviation of the estimate.

FIG. 3 shows a probability distribution of estimated intensity for an example event. This represents a snapshot in time; the estimate will change and be updated over time. The change detection subsystem will identify these changes. In FIG. 3, the curve represents the likelihood of a given level of peak ground acceleration and follows the form of a Gaussian (normal) distribution. This is the preferred embodiment of the probability distribution, but others are possible. The expected value of ground motion is represented by the mean 10 of the probability distribution in the preferred embodiment. In the preferred embodiment the uncertainty in the estimated ground motion is represented by the standard deviation 11 of the probability distribution. Other metrics are possible, such as full-width-at-half-maximum 12 or 95% confidence interval 13. The EWS communicates the expected value metric and the deviation metric to the policy engine in real time, and the value of these metrics is monitored by the change detection subsystem. When the expected value or the deviation changes, the rules execution subsystem is notified to process its rules.

Policy Execution Subsystem

The policy execution subsystem 4 processes the policies and triggers actions as indicated. Policies may trigger actions that are contradictory. To detect this, all actions are aggregated and conflicts resolved before passing action events to the action processing subsystem 5.

Policy processing occurs whenever there is a change on any input referenced by any policy. This is only affected by the rate limiting specification. Fuzzy control updates can be further restricted to changing only when the change will exceed some threshold. In some embodiments, this can be handled in the change subsystem by quantizing the inputs either in time (rate-limiting) or value (through change thresholds or filtering). Hysteresis, as described similarly above, can also be specified in the policy execution subsystem for any control output to prevent small changes in policy inputs from causing the control to change state.

Rule Specification

Each rule is processed by evaluating the predefined methods outlined in the Policies Specification and comparing it with the threshold value in the predicate expression. The functional forms of the built-in methods in the preferred embodiment are:

```
real prob = poe(real level, optional real band) {
        (real ev, real dev, real time) = get_metrics(1, band);
        prob = probability_function(ev, dev, level);
}
real rate = roc(int W, optional real band) {
        /* W = desired window length for rate calculations */
        (real* ev, real* dev, real* time) = get_metrics(W, band);
        rate = rate_function(ev, dev, time);
}
(real* ev, real* dev, real* time) = get_metrics(int window, real band) {
        for int J=1:window {
          int sample =[most recent sample] – J + 1;
          if (band == 0) {
            (ev(J), real maxband) = max([expected value](sample));
            dev(J) = [deviation](sample)(maxband);
          } else {
            ev(J) = [expected value](sample)(band);
            dev(J) = [deviation](sample)(band);
          }
          time(J) = [observation time](sample);
        }
}
```

The function probability_function takes three arguments:

expected value: the most likely value of the object as determined by the EWS. In the preferred embodiment, expressed as an arithmetic mean. Other expressions are possible.

deviation: an expression of the uncertainty in the measurement, as determined by the EWS. In the preferred embodiment, expressed as a standard deviation. May also be expressed as variance, full width at half maximum, or 95% confidence interval. Other expressions are possible.

level: the desired threshold value for the object, at which the probability of exceedance is calculated.

The function returns the probability of exceedance, using one of the following techniques:

function: any continuous function such as a cumulative distribution function that is defined over all possible values of level. In the preferred embodiment, the cumulative distribution function of a normal distribution:

$$P(\text{level}) = \frac{1}{2}\left[1 + \text{erf}\left(\frac{\text{level} - ev}{\sqrt{2(dev)^2}}\right)\right]$$

where level is expressed either in linear or logarithmic form. Other functions are possible. A Cauchy distribution follows the form $$P(\text{level}) = \frac{1}{\pi}\tan^{-1}\left(\frac{\text{level} - ev}{dev}\right) + \frac{1}{2}$$

while a Laplace distribution follows the form $$P(\text{level}) = \frac{1}{2}\left[1 + \text{sgn}(\text{level} - ev)\left(1 - e^{-\frac{|\text{level}-ev|}{dev}}\right)\right].$$

table: a lookup table of probabilities and levels defined over all possible values of level.

EXAMPLE

| Level | Probability |
|---|---|
| ≤ev | 1 |
| >ev | 0 |

This example is equivalent to a degenerate case in which the expected value is considered to be errorless (i.e., dev=0). A more generic example might be:

| Level (MMI) | Probability |
|---|---|
| ≤1 | 0.99 |
| 1-2 | 0.95 |
| 2-3 | 0.85 |
| 3-4 | 0.5 |
| 4-5 | 0.15 |
| 5-6 | 0.05 |
| >6 | 0.01 | which is an approximation of a normal distribution with mean 3.5 and standard deviation 1.

interpolated table: similar to the table technique, except values of level between the values in the table are interpolated. Example:

| Level | Probability |
|---|---|
| <ev − dev | 1 |
| ≥ev − dev AND ≤ev + dev | Linearly interpolated |
| >ev + dev | 0 |

Other techniques are possible.

The function rate_function takes three array arguments:

expected value array: an array of the last W expected value metrics from the EWS.

deviation array: an array of the last W deviation metrics from the EWS.

time array: an array of times at which the EWS generated the above metrics.

The function returns the rate of change of the object based on the values of the arguments.

Figure 4:
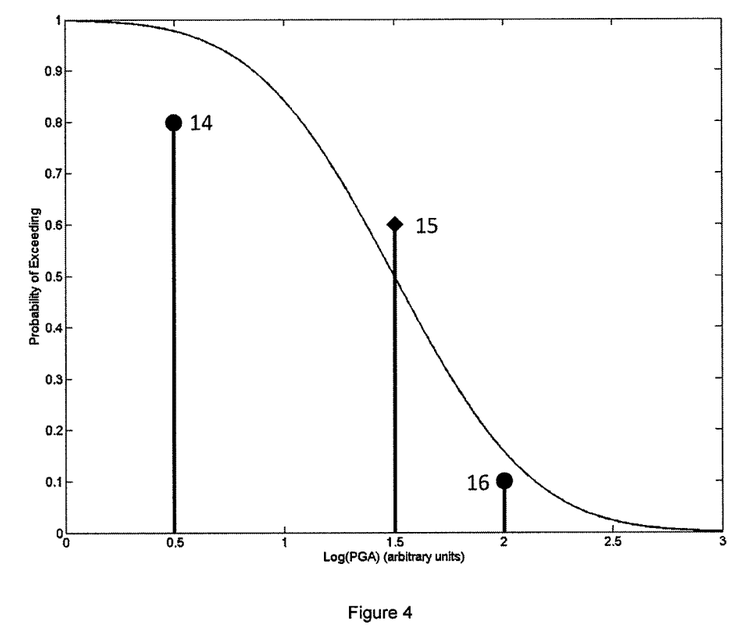
FIG. 4 is a representation of the probability of exceeding any ground motion, superimposed on the hypothetical policy from FIG. 2, showing actions which are initiated and actions which are not, based on the example probability curve.

FIG. 4 shows the probability of exceedance function for the example event shown in FIG. 3. The curve is the cumulative distribution function of the Gaussian in FIG. 3, and the hypothetical policy from FIG. 2 is superimposed on this curve. The curve represents the return value on the y-axis of event.acceleration.poe for input values along the x-axis. In this representation, any rules which fall to the left of the curve are executed and are plotted as circles, while rules which fall on the right of the curve are not executed and are plotted as diamonds. Using the example of the hypothetical policy from FIG. 2:

1. event.acceleration.poe (3.16)=0.97, therefore action_A is initiated (see 14)
2. event.acceleration.poe (31.6)=0.5, therefore action_B is not initiated (see 15)
3. event.acceleration.poe (100)=0.15, therefore action_C is initiated (see 16)

As the expected value and deviation metrics are updated, these rules are re-evaluated. Actions which are not initiated in FIG. 4 may be subsequently initiated when new information becomes available. Likewise, actions which are initiated in FIG. 4 may be subsequently terminated, or may be allowed to proceed depending on the action definition (see below).

Action Processing Subsystem

The actions processing subsystem 5 is responsible for performing the actions triggered by the policy execution subsystem 4. Many of these actions require sustained monitoring, such as streaming an audio alert message or controlling equipment requiring a multi-step interface. The actions processing subsystem is responsible for ensuring that all initiated actions are completed. The rules execution subsystem may initiate subsequent actions that cancel previous actions. One such example is a streaming audio alert message that may be replaced by a more urgent message if the estimated shaking greatly increases. The actions processing subsystem is responsible for terminating the streaming of the previous message and starting the new one.

An action can be a continuous function of input parameters.

An example of continuous action: maintain a motor's speed for estimated intensities below MMI VI. At MMI VI begin to decrease the motor's speed until the motor is running at half speed at MMI VIII. If the intensity will be above MMI VIII, shut the motor down. The motor may be in a ventilation fan which should be kept running as long as possible, but can be damaged if running during high intensity shaking.

Actions can be rate-limited to avoid initiating them too rapidly if inputs are changing rapidly.

Hysteresis can be specified.

Actions can be bi-stable; once triggered they cannot be re-triggered without an explicit reset.

Actions can have start, pause, re-trigger, and stop operations.

Actions can run local scripts.

Actions can set local variables to be used by other policies.

Actions can send data to remote devices.

Each action describes what is to be done to start and complete the task. Some examples:

```
/* turn a relay on for 1 second, then turn it off */
set relay on for 1 second then off
/* stream an audio alert comprising a klaxon sound and a voice message,
repeating until stopped */
loop ( play ( klaxon_sound ); play ( voice_message ) ) until reset
```

Each action definition also includes what must be done to retrigger or terminate it. An example action to open a door might be defined as follows:

```
open_door {
    start: set relay_1 on for 1 second then off;
    retrigger: set relay_1 on for 1 second then off;
    stop: set relay_1 off;
}
```

In some embodiments, this is another way to handle the consequences of input changes that might cause a control to switch on/off/on. An action can be defined such that, once started, the only way to turn it off is a separate reset condition (like a manual input or a timer). This also reduces the consequences of noisy inputs. For example, once over the threshold, the action can be started and the inputs can be ignored until the reset condition is satisfied, such as waiting for a predetermined period of time.

An action to stream an audio alert message might be defined as follows:

```
audio_alert {
    start: loop ( play ( klaxon_sound ); play ( voice_message ) ) until
    stop;
    retrigger: ;
    stop: ;
}
```

These definitions can be supplied with a formal language, XML format, or other representations. The preferred embodiment uses the following syntax (EBNF):

```
action_definitions    ::= action_name ( '(' ( parameter )+ ')' )?
                          '{' ( action_spec )+ '}'
action_name           ::= identifier
parameter             ::= identifier
action_spec           ::= start_spec | retrigger_spec | stop_spec
start_spec            ::= 'start' ':' compound_statement ';'
retrigger_spec        ::= 'retrigger' ':' compound_statement ';'
stop_spec             ::= 'stop' ':' compound_statement ';'
compound_statement    ::= statement | statement_block
statement_block       ::= '{' ( statement )+ '}'
statement             ::= set_statement | loop_statement |
                          function_statement
set_statement         ::= 'set' variable '=' value ( 'for' duration
                          ( 'then' value )? )?
value                 ::= boolean | integer | real | string
boolean               ::= 'on' | 'off' | 'true' | 'false'
duration              ::= float
loop_statement        ::= 'loop' statement_block 'until' condition
condition             ::= expression
function_statement    ::= function_name '(' ( parameter )* ')'
function_name         ::= identifier
```

Functions can be defined within the Policy Engine or can reference external procedures either by executing programs in the local environment, using remote procedure calls, or some other similar method. For example:

script (bash, "snmptrap server -p alert 0 0 6")

Executes the command "snmptrap server -p 0 0 6" using the bash shell.

Traceback Subsystem

All operations of the Policy Engine are logged using the traceback subsystem 6 so that the behavior of the system can be examined later to evaluate its performance and provide an audit trail for control actions taken. This information is useful for updating rules and for validating system operation.

In some embodiments, all or some of the above mentioned subsystems are integrated into a single application. In other embodiments, some or all of the above mentioned subsystems are run as independent processes or as threads. All such system partitions are included in this disclosure.

Policy Inputs

Policies can operate on parametric information provided by the EWS, as represented in the event object (see above). Policies can also generate local state which can be used by other policies. Policies can also monitor external variables, such as real-time equipment status. These are depicted in FIG. 5.

Multiple Policies

Figure 5:
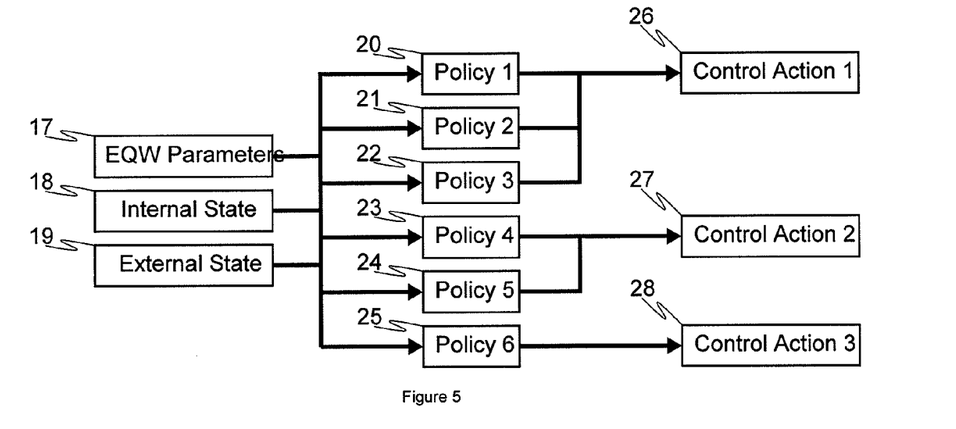
FIG. 5 is a depiction of an example of the data flow through the Policy Engine showing the various inputs, policies, and control actions that may be defined for a particular application.

FIG. 5 shows one example of the data flow through the Policy Engine. Inputs (17-19) feed the policies (20-25) which initiate several control actions (26-28) for various conditions. Note that several policies may initiate the same action response. For example:

```
if event.mmi.poe (9) >= 0.8 then initiate_action_1
    -- policy 1
if event.mmi.poe (9) >= 0.5 and unsafe_condition == true then
initiate_action_1
    -- policy 2
if event.mmi.poe (7) >= 0.8 and vulnerable_condition == true then
initiate_action_1
    -- policy 3
```

In normal operation the equipment will be able to ride out very strong shaking without damage, so shut down is not initiated unless violent shaking is expected with high confidence (policy 1). However, if the equipment is in some unsafe state (such as interacting with an operator) shut down is initiated at lower confidence levels (policy 2), as failure is likely to cause injury to exposed personnel and the associated cost is greater. If the equipment is in a condition of heightened vulnerability (such as in some mode of operation, like self-calibration), shut down is initiated at a lower level of expected shaking (policy 3).

Policy Conflict Resolution

When multiple policies control the same actions, control conflicts may arise. In the example above, the policies are defining different thresholds for initiating an action. A simple OR of the rule outputs is sufficient. In more complex scenarios, a more sophisticated approach is needed. Take the example of a commuter train. Normal deceleration can slow the train by 3.5 km/hr/s and emergency deceleration can slow it by 5 km/hr/s. The goal is to reduce the speed of the train sufficiently to prevent derailments. Emergency deceleration of the train raises the likelihood of injuries to passengers, so normal deceleration is the default choice. However, if the time needed to slow the train is greater than the time until the arrival of the shock waves, emergency deceleration is warranted. The policies might look like:

```
if event.mmi.poe (7) >= 0.5 then decelerate(normal)
    -- policy 1
if event.mmi.eta ( ) < ( current_velocity – safe_velocity ) / 3.5 then
decelerate(emergency)
    -- policy 2
```

The variables used in the rules are either real-time parameters from the system to be controlled (current_velocity) or predefined constants (safe_velocity). These two policies are in conflict since they are commanding the train to decelerate at different rates. A precedence policy can be defined that directs the proper response:

precedence: decelerate(emergency>normal)

Or precedence can be inferred from the order in which the policies are specified. Or each policy can be marked with an explicit precedence.

User Policy Capture

The detailed language and specification discussed above allows an expert to express flexible and sophisticated rules for alert policies. This level of detail is not needed for all users. Any number of simpler methods of capturing policies can be implemented that present the end user with a simpler set of choices. These are mapped into the underlying rules specifications automatically. Among such methods are:

Selecting from pre-defined templates tailored for particular applications.

Providing a graphical method for specifying policies.

Showing a simulation of Policy Engine response to permit policy refinements.

Variations and modifications of the devices and methods disclosed herein will be readily apparent to persons skilled in the art. As such, it should be understood that the foregoing detailed description and the accompanying illustrations, are made for purposes of clarity and understanding, and are not intended to limit the scope of the invention, which is defined by the claims appended hereto. Any feature described in any one embodiment described herein can be combined with any other feature of any of the other embodiment whether preferred or not.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes.

What is claimed is:

1. A system for distributing warnings regarding an event, the system comprising:
    a policy specification subsystem for generating one or more machine readable policies, each policy comprising at least one rule and at least one action associated with the at least one rule, wherein each rule includes a plurality of event parameters and an associated plurality of predetermined event parameter probabilities;
    a change detection subsystem for receiving and monitoring data from a sensor system, the data including expected event parameter values and associated deviation metrics;
    a policy execution subsystem for executing the at least one rule and triggering the at least one action based on a comparison of the expected event parameter values and associated deviation metrics with the event parameters and the associated predetermined event parameter probabilities of the at least one rule, wherein the policy execution subsystem initiates processing of the at least one rule after receiving instructions from the change detection subsystem, wherein the change detection subsystem sends instructions to the policy execution subsystem upon detection of a predetermined change in at least one of the expected event parameter values; and
    an action processing subsystem for generating an output for performing the at least one action triggered by the policy execution subsystem.

2. The system of claim 1, further comprising a traceback subsystem that logs the operations of each subsystem to fixed media for evaluation following an event.

3. The system of claim 1, wherein the policy specification subsystem can accept input from an end user or third party or a combination of the end user and third party to generate the machine readable policy.

4. The system of claim 1, wherein the at least one rule comprises a Boolean predicate.

5. The system of claim 1, wherein the at least one rule comprises a fuzzy rule and the at least one action comprises a continuous action function.

6. The system of claim 4 wherein the at least one rule is expressed as a probability of exceeding a predetermined value of one of the plurality of event parameters.

7. The system of claim 6 wherein the probability of exceeding a predetermined value is computed based on a Gaussian distribution with a predetermined expected value and deviation.

8. The system of claim 1, wherein the policy execution subsystem executes the at least one rule in serial order and resolves conflicts and triggers actions based on the resolved rules.

9. The system of claim 1, wherein the action processing subsystem monitors the performance of triggered actions to verify that the actions have been executed to completion.

10. The system of claim 1, wherein the warning contains a parameterized summary of the event.

11. The system of claim 10 wherein the parameterized summary includes a probability distribution or information for the computation of a probability distribution.

12. The system of claim 1 wherein the output is produced periodically based upon detection of a predetermined change in at least one of the expected event parameter values.

13. The system of claim 1 wherein the policy comprises a predicate and an action or a continuous function of input parameters and a continuously varying control output.

14. The system of claim 1 wherein the policy specification subsystem receives information regarding the status of a device that receives the output of the action processing subsystem and modifies the policy based on the status of the device.

15. The system of claim 1 wherein the policy specification subsystem adjusts the rules based on past data.

16. The system of claim 1 wherein the rules are updated in real time.

17. The system of claim 1 wherein the policy specification subsystem comprises a plurality of user interfaces tailored to a user's level of expertise that allows the user to customize the rules.

18. The system of claim 11, wherein the probability distribution represents the severity of the event.

19. The system of any claim 1, wherein the output is sent to a speaker or a display to generate a warning message.

20. The system of claim 1, wherein the output energizes a relay or controls the operation of a motor, engine or turbine.

21. The system of claim 1 wherein the event is an earthquake and the event parameters include one or more of peak ground jerk, peak ground acceleration, peak ground velocity, peak ground displacement, modified Mercalli intensity, estimated time of arrival of hazardous shaking, and actual time of the arrival of S-waves.

22. The system of claim 1 wherein each policy is assigned a priority.

23. The system of claim 22 wherein the priority is specified through definition order, manually assigned by a user, or changed by the actions of a policy.

24. The system of claim 1 wherein the rules can reference action states and external system variables.

25. A computer implemented method for distributing warnings regarding an event, the method comprising:
    generating one or more machine readable policies, each policy comprising at least one rule and at least one action associated with the at least one rule, wherein each rule includes a plurality of event parameters and an associated plurality of predetermined event parameter probabilities;
    receiving and monitoring data from a sensor system, the data including expected event parameter values and associated deviation metrics;
    initiating processing of the at least one rule upon detection of predetermined change in at least one of the expected event parameter values;
    executing the at least one rule and triggering the at least one action based on a comparison of the expected event parameter values and associated deviation metrics with the event parameters and the associated predetermined event parameter probabilities of the at least one rule; and
    generating an output for performing the at least one action triggered by the policy execution subsystem.

26. The method of claim 25, further comprising logging the operations of each subsystem to fixed media for evaluation following an event.

27. The method of claim 25, further comprising accepting input from an end user or third party or a combination of the end user and third party to generate the machine readable policy.

28. The method of claim 25, wherein the at least one rule comprises a Boolean predicate.

29. The method of claim 25, wherein the at least one rule comprises a fuzzy rule and the at least one action comprises a continuous action function.

30. The method of claim 28 wherein the at least one rule is expressed as a probability of exceeding a predetermined value of one of the plurality of event parameters.

31. The method of claim 30 wherein the probability of exceeding a predetermined value is computed based on a Gaussian distribution with a predetermined expected value and deviation.

32. The method of claim 25, further comprising executing the at least one rule in serial order and resolving conflicts and triggers actions based on the resolved rules.

33. The method of claim 25, further comprising monitoring the performance of triggered actions to verify that the actions have been executed to completion.

34. The method of claim 25, wherein the warning contains a parameterized summary of the event.

35. The method of claim 34 wherein the parameterized summary includes a probability distribution or information for the computation of a probability distribution.

36. The method of claim 25 wherein the output is produced periodically based upon detection of a predetermined change in at least one of the expected event parameter values.

37. The method of claim 25 wherein the policy comprises a predicate and an action or a continuous function of input parameters and a continuously varying control output.

38. The method of claim 25 further comprising receiving information regarding the status of a device that receives the output of the action processing subsystem and modifies the policy based on the status of the device.

39. method of any claim 25 further comprising adjusting the rules based on past data.

40. The method of claim 25 further comprising updating the rules in real time.

41. The method of claim 25 further comprising customizing the rules using a plurality of user interfaces tailored to a user's level of expertise.

42. The method of claim 25, wherein the probability distribution represents the severity of the event.

43. The method of claim 25, further comprising sending the output to a speaker or a display to generate a warning message.

44. The method of claim 25, further comprising sending the output to energize a relay or control the operation of a motor, engine or turbine.

45. The method of claim 25 wherein the event is an earthquake and the event parameters include one or more of peak ground jerk, peak ground acceleration, peak ground velocity, peak ground displacement, modified Mercalli intensity, estimated time of arrival of hazardous shaking, and actual time of the arrival of S-waves.

46. The method of claim 25 further comprising assigning a priority to each policy.

47. The method of claim 46 wherein the priority is specified through definition order, manually assigned by a user, or changed by the actions of a policy.

48. The method of claim 25 wherein the rules can reference action states and external system variables.

49. A device for distributing warnings regarding an event, the device comprising:
   a processor and memory for storing instructions which when executed by the processor causes the processor to:
   generate one or more machine readable policies, each policy comprising at least one rule and at least one action associated with the at least one rule, wherein each rule includes a plurality of event parameters and an associated plurality of predetermined event parameter probabilities;
   receive and monitor data from a sensor system, the data including expected event parameter values and associated deviation metrics;
   initiate processing of the at least one rule upon detection of a predetermined change in at least one of the expected event parameter values;
   execute the at least one rule and triggering the at least one action based on a comparison of the expected event parameter values and associated deviation metrics with the event parameters and the associated predetermined event parameter probabilities of the at least one rule; and
   generate an output for performing the at least one action triggered by the policy execution subsystem.

* * * * *